United States Patent [19]

Swisher, Jr.

[11] Patent Number: 5,383,743

[45] Date of Patent: Jan. 24, 1995

[54] VEHICLE HAVING A DRIVE TRAIN WITH TWO SHOCK-ABSORBING COUPLINGS

[76] Inventor: George W. Swisher, Jr., 1500 Dorchester Dr., Oklahoma City, Okla. 73120

[21] Appl. No.: 118,062

[22] Filed: Sep. 7, 1993

[51] Int. Cl.$^6$ .............................................. E01C 23/12
[52] U.S. Cl. ...................... 404/90; 180/383; 299/39; 464/33
[58] Field of Search ............ 404/90, 91, 92; 299/10, 299/36, 37, 39; 403/1, 2, 359; 464/87, 88, 89, 91, 30, 32, 33; 180/383

[56] References Cited

U.S. PATENT DOCUMENTS

| | | | |
|---|---|---|---|
| 1,439,380 | 12/1922 | Ryding et al. | 464/33 |
| 1,822,623 | 9/1931 | Hill | 180/383 X |
| 2,691,283 | 10/1954 | Stover | 180/383 X |
| 3,779,608 | 12/1973 | Hatcher et al. | 299/39 |
| 4,012,923 | 3/1977 | Lundgren | 469/91 X |
| 4,118,951 | 10/1978 | Neasham | 180/383 X |
| 4,139,318 | 2/1979 | Jakob et al. | 404/90 |
| 4,140,420 | 2/1979 | Swisher, Jr. et al. | 404/84 |
| 4,195,946 | 4/1980 | Swisher, Jr. | 404/75 |
| 4,325,580 | 4/1982 | Swisher, Jr. et al. | 299/39 |
| 4,894,043 | 1/1990 | Nixon, Jr. | 464/33 |
| 5,085,289 | 2/1992 | Chance | 180/383 |
| 5,190,398 | 3/1993 | Swisher, Jr. | 404/90 |

OTHER PUBLICATIONS

Caterpillar, "CAT RR-250 Road Reclaimer" (May 1987).
Caterpillar, "product training bulletin" RR-250 Road Reclaimer (1986).
Bomag AMCA Int'l, "BOMAG MPH100 Recycler" (no date).
Rexworks, Inc., "Pulvi-Master Reclaimer & Stabilizer" (no date).
Pettibone, Model P-500-SP (Hammermill) Pulverizer (no date).

Primary Examiner—Ramon S. Britts
Assistant Examiner—James A. Lisehora
Attorney, Agent, or Firm—Dunlap, Codding & Lee

[57] ABSTRACT

A vehicle with a drive train having two shock-absorbing couplings. The drive train includes an engine, a transmission, the two shock-absorbing couplings connected together, a differential, a drive assembly and a rotatable assembly, such as a cutter drum. The transmission has a transmission output shaft which is connected by a universal joint to the first shock-absorbing coupling. Similarly, the differential has a differential input shaft which is connected by another universal joint to the second shock-absorbing coupling. The increased shock-absorbing capacity provided by two couplings reduces the failure rate of the drive train. To protect the drive train, a pair of shear members joined by shear bolts are used to connect the shock-absorbing couplings together.

3 Claims, 3 Drawing Sheets

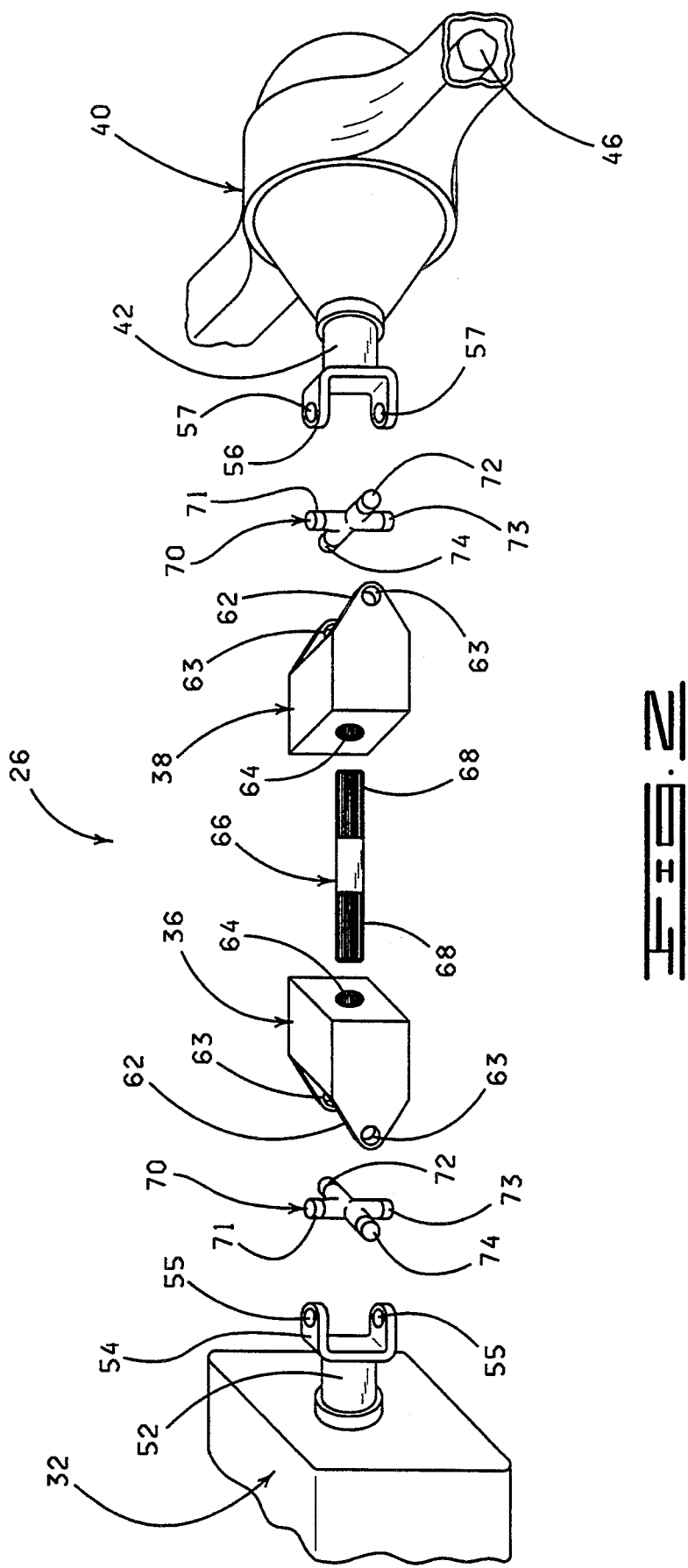

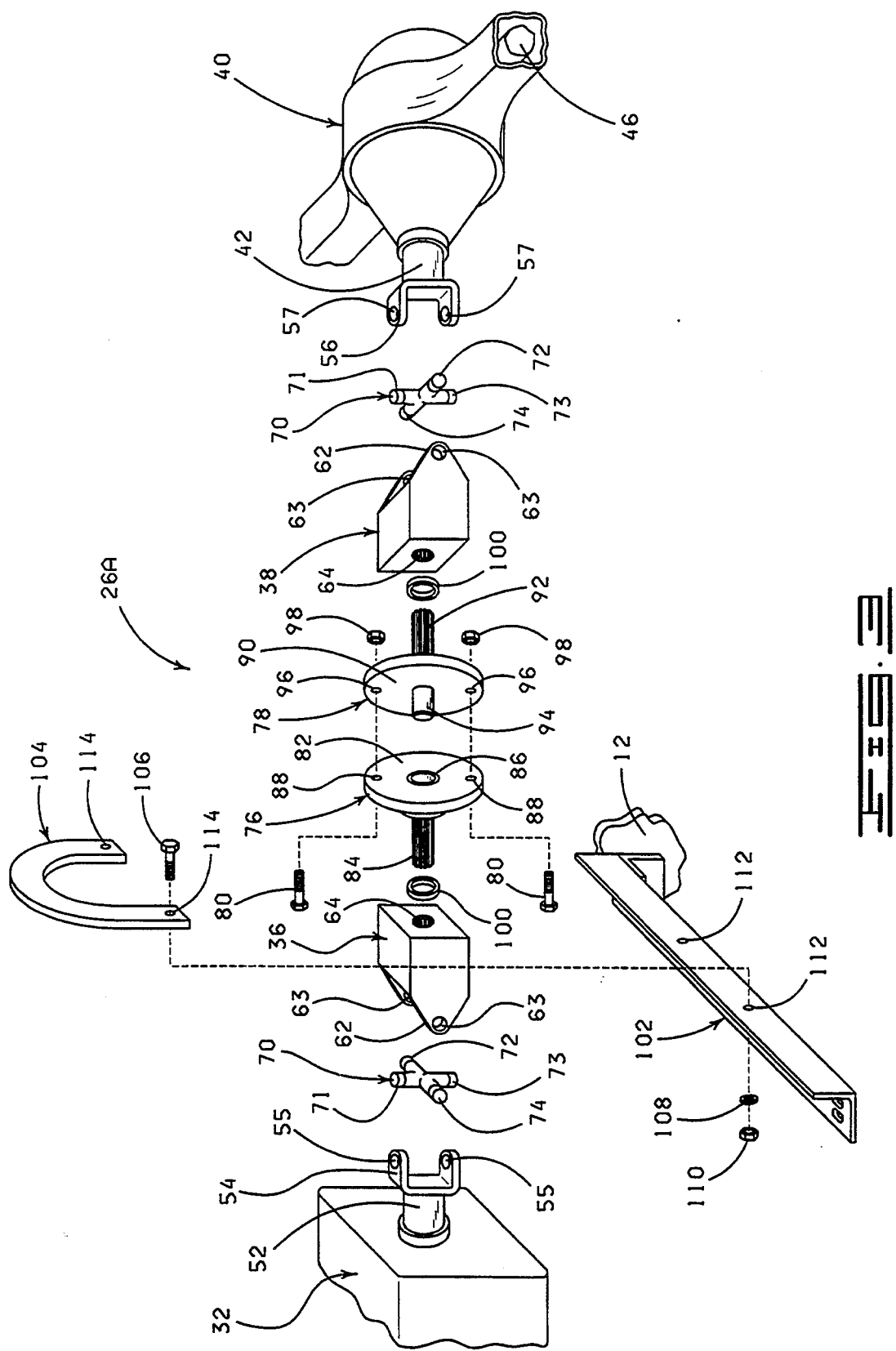

VEHICLE HAVING A DRIVE TRAIN WITH TWO SHOCK-ABSORBING COUPLINGS

BACKGROUND OF THE INVENTION

1. Field of the Invention

The present invention relates to vehicles having a drive train for rotating an assembly, such as a cutter drum assembly.

2. Description of Related Art

Vehicles having rotatable cutter drums for cutting and pulverizing a roadway or roadbed are well known in the art. These vehicles may be used to break up a wide variety of materials ranging from soil to hard pavement or rock. When used to break up materials like rock and pavement in particular, the cutter drum and its drive train may be subjected to substantial shock.

One way to protect the cutter and cutter drive is to put a yoke with shear pins in the drive train. The shear pins are designed to break before torsional shock reaches a level which can damage the components of the cutter and cutter drive train. Shearing helps protect the equipment, but puts the vehicle out of operation until the sheared-off yoke is replaced.

Since shearing results in down-time for the vehicle, it is desirable to reduce or eliminate shearing. Any reduction in the occurrence of shearing, however, should be accomplished without exposing the vehicle to greater risk of damage from torsional stress.

SUMMARY OF THE INVENTION

The present invention is a vehicle having a drive train with a pair of shock-absorbing couplings. The drive train includes a transmission, a pair of connected shock-absorbing couplings and a differential. The differential has a pair of output shafts, each of which is connected to the driven end of a chain or belt drive assembly. The opposite, driving end of each chain drive is connected to a corresponding end of a cutter drum to rotate the cutter drum.

One object of the present invention is to provide a vehicle which reduces the amount of shock transferred from the cutter drum to the transmission of the vehicle.

Another object of the present invention is to provide a vehicle capable of breaking up rock and pavement with a minimum of down-time from shear pin failures.

Other objects, features and advantages of the present invention are apparent from the following detailed description when read in conjunction with the accompanying drawings and appended claims.

BRIEF DESCRIPTION OF THE DRAWINGS

FIG. 2 is an exploded, perspective view of the drive train between the transmission and the differential of the vehicle of FIG. 1.

FIG. 3 is an exploded, perspective view of another embodiment of a drive train constructed in accordance with the present invention.

DETAILED DESCRIPTION OF THE PREFERRED EMBODIMENTS

Figure 1:
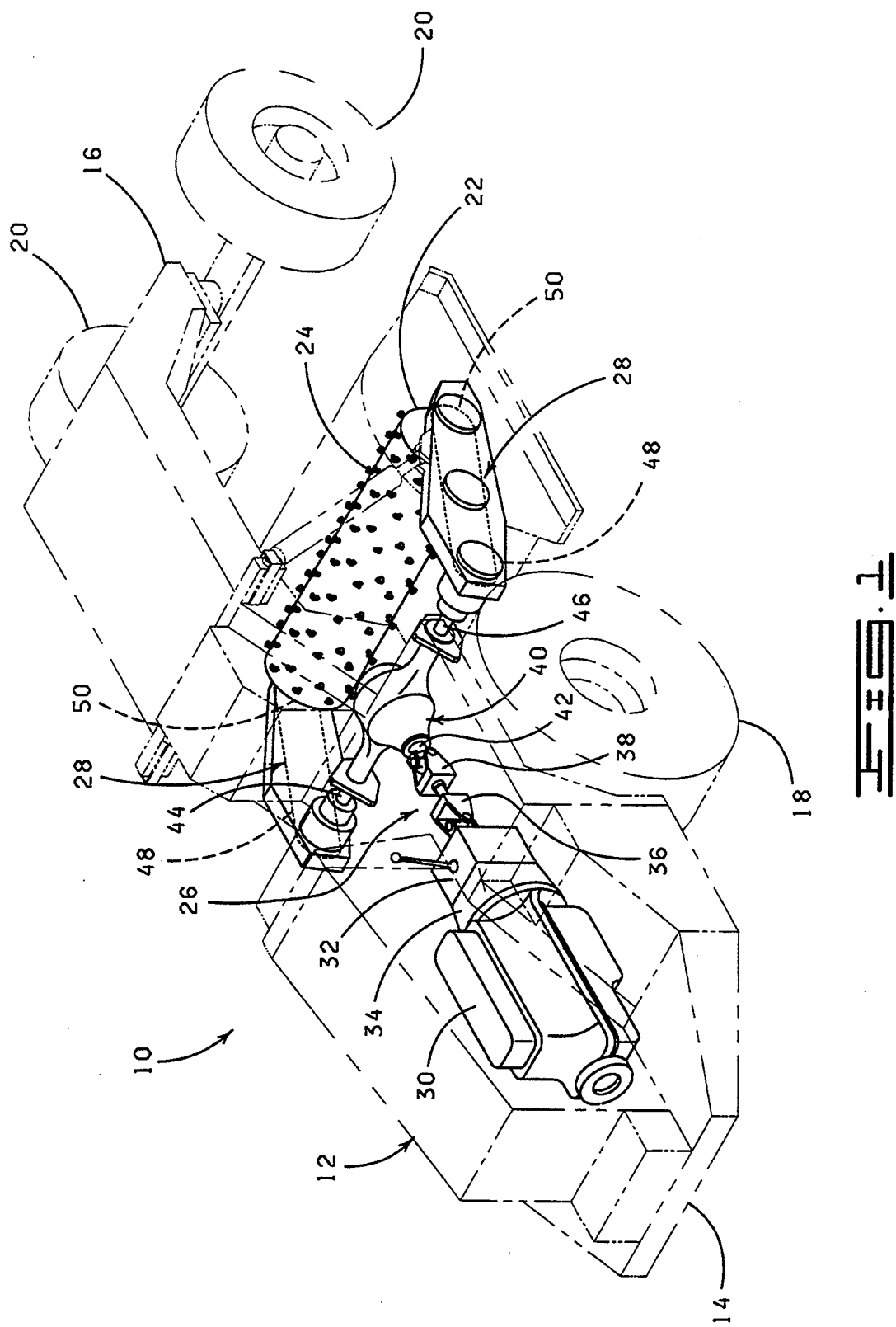
FIG. 1 is a perspective view of a vehicle with a cutter drum and drive train constructed in accordance with the present invention.

Referring to the drawings in general, and to FIG. 1 in particular, shown therein and designated by the general reference numeral 10 is a vehicle (shown in phantom lines) for traveling over a surface and breaking up a surface layer of material. The vehicle 10 includes a frame 12 having a front end 14 and a rear end 16, a set of front wheels 18 and a set of rear wheels 20. A cutter drum 22 is suspended from the frame 12 between the front wheels 18 and the rear wheels 20.

The cutter drum 22 is adapted to be raised from a surface and to be lowered to various depths below the surface. As illustrated by FIG. 1, a plurality of cutter teeth extend from the exterior of the cutter drum 22 for cutting through and breaking up material. One of the cutter teeth is designated by reference numeral 24 and is generally representative of the cutter teeth of the cutter drum 22.

The cutter drum 22 is rotated by a drive train 26 and a pair of drive assemblies 28. The drive train 26 includes an engine 30, a manual transmission 32, a clutch 34, a pair of shock-absorbing couplings 36 and 38 and a cutter differential 40.

The engine 30 is typically a diesel engine adapted for rotating the wheels 18 and 20 of the vehicle 10 and for driving rotatable assemblies, such as the cutter drum 22, in a conventional manner. The clutch 34 operatively interconnects the engine 30 and the manual transmission 32.

The pair of shock-absorbing couplings 36 and 38 are positioned between the output of the transmission 32 and the input of the differential 40. A coupling suitable for use as the shock-absorbing couplings 36 and 38 is disclosed in U.S. Pat. No. 5,085,289, which is hereby incorporated by reference.

The differential 40 may be any suitable unit which is known in the art. The differential 40 receives rotation at a medial input shaft 42 and translates that rotation ninety-degrees to two oppositely extending output shafts 44 and 46.

Each output shaft 44 and 46 of the differential 40 is operatively connected to the driven end 48 of a corresponding one of the drive assemblies 28. The drive assemblies 28 may be any acceptable chain-and-sprocket or belt-and-pulley drive mechanism. The driving end 50 of each drive assembly 28 is connected axially to a corresponding drive end of the cutter drum 22. Thus operation of the drive assemblies 28 turns the cutter drum 22 about the central axis of the cutter drum 22.

Referring now to FIG. 2, shown therein is the assembly of the shock-absorbing couplings 36 and 38 between the transmission 32 and the differential 40. The transmission 32 includes a transmission output shaft 52 with a universal joint yoke 54 having a pair of pin holes 55. Similarly, the differential 40 has the differential input shaft 42 with a universal joint yoke 56 having a pair of pin holes 57.

Each shock-absorbing coupling 36 and 38 has a yoke end and an opposite shock-absorbing end. The yoke end of each shock-absorbing coupling 36 and 38 is adapted with a universal joint yoke 62 having a pair of pin holes 63, while the shock-absorbing end of each shock-absorbing coupling 36 and 38 has an internally splined bore 64.

A coupling shaft 66 is provided to join the two shock-absorbing couplings 36 and 38 together. The coupling shaft 66 has two splined ends 68 which are sized and shaped to mate with the splined bores 64 of the shock-absorbing couplings 36 and 38. Each splined end 68 of the coupling shaft 66 is inserted into a corresponding one of the splined bores 64 of the shock-absorbing couplings 36 and 38 to connect the couplings 36 and 38 for rotation together.

A universal joint member 70 is provided to connect the universal joint yoke 54 of the transmission 32 to the universal joint yoke 62 of the first shock-absorbing coupling 36. The universal joint member 70 has four pins 71, 72, 73 and 74. Two of the pins 71 and 73 are inserted into the pin holes 55 of the transmission universal joint yoke 54 and two pins 72 and 74 are inserted into the pin holes 63 of the first shock-absorbing coupling 36.

A second universal joint member 70 is used to join the second shock-absorbing coupling 38 to the differential 40. In the manner previously described, the second universal joint member 70 has four pins 71, 72, 73 and 74 which are inserted into the pin holes 63 and 57 of the second shock-absorbing coupling 38 and the differential 40, respectively.

In operation, rotation of the transmission output shaft 52 turns the shock-absorbing couplings 36 and 38 and the differential input shaft 42. Through the differential 40, rotation of the differential input shaft 42 is translated into rotation of the two differential output shafts 44 and 46. The differential output shafts 44 and 46 drive the drive assemblies 28, which drive the cutter drum 22.

By utilizing the two shock-absorbing couplings 36 and 38 in series, the shock-absorbing capability of the drive train 26 is enhanced. Accordingly, the likelihood of drive train 26 component failure due to shearing from torsional shock or stress is reduced.

It should be appreciated that the drive train 26 with two shock-absorbing couplings 36 and 38 may be installed in any vehicle having a rotating assembly. The drive train 26 is particularly effective when used with a rotating assembly which is often subjected to stress, such as the cutter drum 22 in the vehicle 10 for breaking up dirt, rock or pavement.

Embodiment of FIG. 3

Referring now to FIG. 3, shown therein and designated by reference character 26A is another embodiment of a drive train constructed in accordance with the present invention. The drive train 26A is the same as drive train 26 except for the components between the two couplings 36 and 38.

Instead of the splined coupling shaft 66, the drive train 26A includes a female shear member 76, a male shear member 78 and a plurality of shear bolts 80, which secure the female shear member 76 and the male sheer member 78 together. It should be appreciated that the shear bolts 80 are constructed to break when subjected to a predetermined amount of shear force.

The female shear member 76 comprises a female shear plate 82, a splined shaft 84 and a female bushing 86. The splined shaft 84 and the female bushing 86 of the female shear member 76 are located on opposite sides of the female shear plate 82. The splined shaft 84 of the female shear member 76 is sized and shaped to mate with the splined bore 64 of the shock-absorbing coupling 36. A plurality of shear bolt holes 88 extend through the female shear plate 82 to receive the shear bolts 80.

The female bushing 86 may simply be a cylindrical opening extending into the female shear member 76. Alternatively, the female bushing 86 may comprise any conventional bushing having ball bearings or cylindrical bearings or the like to facilitate rotation of the female bushing 86 about a cylindrical structure journaled into or through the female bushing 86.

The male shear member 78 includes a male shear plate 90, a splined shaft 92 and a protruding hub 94. The splined shaft 92 and the hub 94 extend from opposite sides of the male shear plate 90. The splined shaft 92 of the male shear member 78 is sized and shaped to mate with the splined bore 64 of the shock-absorbing coupling 38.

Like the female shear plate 82, the male shear plate 90 has a plurality of bolt holes 96 through which the shear bolts 80 may be inserted. It should be appreciated that the bolt holes 88 and 96 are alignable for insertion of the shear bolts 80 to connect the female and male shear plates 82 and 90 together. A plurality of nuts 98 are used to secure the shear bolts 80 in place.

Furthermore, a pair of elastomeric bushings 100 are provided as a cushion between the couplings 36 and 38 and the shear plates 82 and 90. One elastomeric bushing 100 is positioned around the splined shaft 84 of the female shear member 76 and serves as a cushion between the first shock-absorbing coupling 36 and the female shear plate 82. Similarly, the other elastomeric bushing 100 is journaled around the splined shaft 92 of the male shear member 78 and acts as a resilient spacer between the male shear plate 90 and the second shock-absorbing coupling 38.

In normal operation, the drive train 26A functions in exactly the same manner as the drive train 26. When the cutter drum 22 gets into a bind and the limits of the shear bolts 80 are exceeded, however, the shear bolts 80 shear off to break the rigid connection between the female shear member 76 and the male shear member 78. A shearing event interrupts the operation of the machine 10, but protects the components of the machine 10 from damage.

When the shear bolts 80 break, the projecting hub 94 of the male shear member 78 remains disposed within the female bushing 86 of the female shear member 76. The transmission output shaft 52, the first coupling 36 and the female shear member 76 continue to rotate until the operator stops the rotation of the transmission output shaft 52.

The male shear member 78, however, is no longer operatively connected to the female shear member 76 for rotation. Accordingly, the male shear member 78, the second coupling 38 and the differential input shaft 42 stop rotating with the female shear member 76 as soon as the shear bolts 80 break.

Thus the shearing of the shear bolts 80 removes the abnormal load condition of the cutter drum 22 from the transmission 32 to protect the components of the drive train 26A from damage. In addition, the shear members 76 and 78 are prevented from separation by the protrusion of the hub 94 into the female bushing 86.

Accordingly, the drive train 26A accomplishes two goals. First, the couplings 36 and 38 absorb physical shock to reduce the number of shearing events. Secondly, the shear members 76 and 78 and shear bolts 80 protect the drive assembly of the machine 10 in cases of severe physical stress.

In the case of a catastrophic event, such as a complete break between components, the drive train 26A continues to rotate until the operator can stop the rotation of the transmission output shaft 52. Because of the universal connection of the transmission shaft 52 and the first coupling 36, the female shear member 76 and the first coupling 36 rotate wildly in such an event. This uncontrolled rotation damage the machine 10 or injure workers before the operator can shut down the drive train 26A.

In order to prevent uncontrolled rotation during such a catastrophic event, a bracket support 102 and a U-shaped bracket 104 are provided to contain the rotation. The bracket support 102 is mounted to the frame 12 of the machine 10 under the first coupling 36. For clarity of illustration, only a portion of one side of the frame 12 is shown in FIG. 3.

The U-shaped bracket 104 is secured to the bracket support 102 in a position such that the bracket 104 and bracket support 102 circumscribe the first coupling 36. As illustrated by FIG. 3, the bracket 104 may be attached to the bracket support 102 with bracket bolts 106, lock washers 108, lock nuts 110, bolt holes 112 in the bracket support 102 and bolt holes 114 in the bracket 104.

The bracket 104 may be attached to the bracket support 102 in any other suitable way, such as by welding or riveting as well. It should be appreciated that the bracket 104 and bracket support 102 should be clear of the first coupling 36 and the rest of the drive train 26A in order to keep from interfering with the rotation of the drive train 26A.

Modifications of the drive train 26A may be made without affecting its basic function. For example, the positions of the female shear member 76 and the male shear member 78 may be switched and the drive train 26A would operate in a manner consistent with the purposes described herein. As another example, the locations of the bracket support 102 and the U-shaped bracket 104 may also be exchanged.

Changes may be made in the combinations, operations and arrangements of the various parts and elements described herein without departing from the spirit and scope of the invention as defined in the following claims.

What is claimed is:

1. A vehicle for traveling over and pulverizing an upper portion of material, the vehicle comprising:
   a wheeled frame;
   an engine mounted to said wheeled frame;
   a transmission operatively connected to said engine and having a transmission output shaft;
   a first shock-absorbing coupling connected to the transmission output shaft;
   a second shock-absorbing coupling connected to said first shock-absorbing coupling;
   a differential connected to said second shock-absorbing coupling and having a pair of differential output shafts;
   a pair of drive assemblies having a driven end and a driving end, the driven end being connected to a corresponding one of the differential output shafts;
   a cutter drum rotatably mounted between the driven ends of said drive assemblies; and
   shearable means, operatively connecting said first and second shock-absorbing couplings, for operatively disconnecting said first shock-absorbing coupling from said second shock-absorbing coupling in response to a predetermined amount of shear force applied to said shearable means, wherein said shearable means further comprises:
   a first shear member connected to said first shock-absorbing coupling;
   a second shear member connected to said second shock-absorbing coupling; and
   a plurality of shear bolts for securing said fist shear member to said second shear member;
   wherein said shear bolts are adapted to shear when subjected to a predetermined amount of shear force; and
   an elastomeric bushing located between said first shear member and said first shock-absorbing coupling.

2. A vehicle for traveling over and pulverizing an upper portion of material, the vehicle comprising:
   a wheeled frame;
   an engine mounted to said wheeled frame;
   a transmission operatively connected to said engine and having a transmission output shaft;
   a first shock-absorbing coupling connected to the transmission output shaft;
   a second shock-absorbing coupling connected to said first shock-absorbing coupling;
   a differential connected to said second shock-absorbing coupling and having a pair of differential output shafts;
   a pair of drive assemblies having a driven end and a driving end, the driven end being connected to a corresponding one of the differential output shafts;
   a cutter drum rotatably mounted between the driven ends of said drive assemblies; and
   shearable means, operatively connecting said first and second shock-absorbing couplings, for operatively disconnecting said first shock-absorbing coupling in from said second shock-absorbing coupling in response to a predetermined amount of shear force applied to said shearable means, wherein said shearable means further comprises:
   a first shear member connected to said first shock-absorbing coupling;
   a second shear member connected to said second shock-absorbing coupling; and
   a plurality of shear bolts for securing said fist shear member to said second shear member;
   wherein said shear bolts are adapted to shear when subjected to a predetermined amount of shear force; and
   an elastomeric bushing located between said second shear member and said second shock-absorbing coupling.

3. A vehicle for traveling over a surface and pulverizing an upper layer of the surface, the vehicle comprising:
   a wheeled frame;
   a cutter drum rotatably mounted to said frame;
   drive means, mounted to said frame, for propelling the vehicle over the surface and for driving rotation of said cutter drum to pulverize an upper layer of the surface; and
   a drive train operatively connecting said drive means with said cutter drum, said drive train including:
   a pair of shock-absorbing couplings;
   shearable means for producing a break in said drive train between said shock-absorbing couplings in response to a predetermined amount of shear force applied to said drive train; and
   an elastomeric bushing positioned between said shearable means and one of said shock-absorbing couplings.

* * * * *